3,278,502
PRODUCTION OF REACTIVE FREE RADICALS
Earl S. Huyser, Lawrence, Kans., and Gordon E. Hartzell, Midland, Mich., assignors to The Dow Chemical Company, Midland, Mich., a corporation of Delaware
No Drawing. Filed Mar. 28, 1963, Ser. No. 268,597
7 Claims. (Cl. 260—80)

This invention relates to a new process and to new chemical compounds which are useful in that process. More particularly, it relates to a new and improved method for initiating a free radical chain reaction and to a new class of bibenzyl compounds which are advantageously used in this and related applications.

The compounds which are useful in this process have the formula

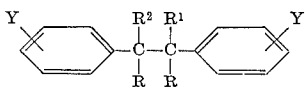

wherein Y is hydrogen, alkyl of one to about six carbon atoms, halogen, phenyl, methoxy, or ethoxy, R is hydrogen, methyl, ethyl, or

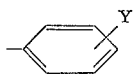

$R^1$ is methoxy, ethoxy, or acetoxy, and $R^2$ is hydrogen, methoxy, ethoxy, or acetoxy. It has been found that these compounds decompose when heated to temperatures of about 100° C. to about 400° C. to liberate reactive methyl or ethyl radicals which are capable of initiating free radical chain reactions.

In the past, reactive free radicals capable of initiating such reactions have been obtained by the thermal cleavage of covalent bonds such as oxygen-oxygen bonds in organic peroxides or carbon-nitrogen bonds in azo compounds. Such compounds, however, are not sufficiently stable to be useful for this purpose at high temperatures. Di-tert-butyl peroxide, one of the more stable compounds of this class, decomposes too rapidly to be useful at temperatures greater than about 140° C. Therefore, since some free radical chain reactions are advantageously carried out at higher temperatures, this kind of chemical initiation has heretofore had somewhat limited application. Our new process now makes possible such chemical initiation of free radical reactions at these higher temperatures.

The formation of free radicals by the breaking of a carbon-carbon bond is normally restricted to cases where the ordinarily high bond strength has been weakened by the close proximity of several bulky substituents. Free radicals thus produced are typically polyaryl substiuted radicals such as triphenylmethyl. Although such radicals have been reported to initiate vinyl polymerization in some cases, they are not generally desirable for the initiation of free radical reactions, and they are, in fact, more adequately described as radical chain terminators.

The present process provides highly reactive methyl or ethyl radicals which are particularly useful for the initiation of free radical chain reactions and these radicals are liberated within a temperature range which makes their use uniquely convenient. Compounds useful in this process as described above are capable of undergoing homolytic cleavage of the central carbon-carbon bond at temperatures of about 100–400° C. Within the preferred temperature range of 115–275° C., these compounds have half-lives of about 0.1–10 hours. The ether-containing radicals first produced by this cleavage evidently then decompose further to form a carbonyl compound and an alkyl radical. This probable mechanism of the thermal decomposition is explained later in more detail.

The process claimed herein, therefore, consists essentially in heating one or more of the compounds described above in contact with a substrate capable of undergoing a free radical reaction. Preferably, this process is operated at about 115–275° C. and the initiating compound is employed in an amount capable of yielding at that temperature a concentration of free radicals sufficient to initiate the reaction involved. Usually, about 0.1% to about 50% by weight of the compound based on the weight of the reacted substrate is used, and preferably about 0.1–10%.

The reactions which are effectively initiated by this process are those which are known to proceed by way of a free radical chain sequence. Classes of reactions which take place in this manner include (1) substitution reactions wherein there are successive displacement reactions, (2) successive addition reactions to unsaturated molecules to produce long chains of covalently bonded atoms, and (3) alternate displacement and addition reactions involving radical additions to multiple bonds. Illustrative of (1) is the side chain halogenation of toluene wherein a halogen atom radical reacts with a molecule of toluene to produce a molecule of hydrogen halide and a benzyl radical, the benzyl radical reacts with a molecule of halogen to produce a molecule of benzyl halide and a halogen atom radical is regenerated to complete the cycle. Vinyl polymerization involving the formation of a larger radical by the addition of a free radical to an olefinically unsaturated bond is the common example of (2) wherein there is produced a long chain of recurring units. Alternate displacement and addition reactions (3) involving radical additions to multiple bonds comprise such reactions as the abnormal addition to olefinic bonds of hydrogen halide, the addition to olefinc bonds of nontertiary, i.e., primary or secondary, alcohols, amines, mercaptans, polyhalides such as bromotrichloromethane and carbon tetrachloride, aldehydes, and hypohalites, and additions to carbonyl bonds such as the addition of cyclohexane to formaldehyde, the polymerization of aldehydes, and the like. These free radical chain reactions are characterized by certain properties, among which there may be mentioned the fact that they are generally insensitive to the ionizing power of solvents, since the intermediates are non-ionic and are not highly polarized and, therefore, they occur similarly in gas and liquid phase. They are not usually catalyzed by acids or bases whereas their acceleration by actinic light or other ionizing radiation, or by conventional free radical sources such as peroxides is typical. Also they are subject to the action of inhibitors such as stable free radicals or substances which yield unreactive radicals which slow or stop the radical chain sequence.

The bibenzyl compounds useful in the present process can be prepared by a number of methods described in the literature. The preferred method for a particular compound depends upon its configuration and the number and types of substituents present. In many cases, the availability of intermediates is a determining factor. Examples 1–7 show the preparation of representative compounds by various routes. Related compounds having other substituents as shown by the general formula defined above are prepared by these and similar known methods.

EXAMPLE 1

A solution of 33.6 g. of diphenyl methane, 39.6 g. of benzhydryl methyl ether, and 35.0 g. of di-tert-butyl peroxide in 150 ml. of chlorobenzene was heated at reflux temperature for 24 hours. The chlorobenzene was removed from the reaction mixture by distillation under reduced pressure on a steam bath and 350 ml. of methyl alcohol was added to the distillation residue. The white solid which crystallized upon cooling was recrystallized from a 1:1 mixture of acetone and methyl alcohol to obtain 8.8 g. of α-methoxy-α,α'-diphenylbibenzyl, M.P. 158–159° C. The structure of this compound was confirmed by elemental analysis and by its nuclear magnetic resonance spectrum.

EXAMPLE 2

α,α'-Dimethoxy-α,α'-diphenylbibenzyl was prepared by heating a mixture of 99.0 g. of benzhydryl methyl ether and 36.6 g. of di-tert-butyl peroxide at 115–120° C. for 6 hours and recrystallizing the product from methyl alcohol and again from acetone. There were obtained white crystals which decomposed slowly on heating at about 100° C.

EXAMPLE 3

A mixture of 192 g. of 4-tert-butyl-α-methylbenzyl methyl ether and 24.3 g. of di-tert-butyl peroxide was heated for 24 hours at 120–125° C. Upon cooling the reaction mixture in an ice bath, a white solid separated which when recrystallized from acetone, yielded 5.5 g. of 4,4'-di-tert-butyl-α,α'-dimethoxy-α,α'-dimethylbibenzyl, white crystals melting at 220–221° C.

EXAMPLE 4

α,α' - Dimethoxy-α,α'-dimethylbibenzyl was prepared from methyl α-methylbenzyl ether and di-tert-butyl peroxide by the procedure shown in Example 3. The product was a white crystalline solid melting at 170.5–172° C.

EXAMPLE 5

α,α'-Dimethoxybibenzyl was prepared by methylating hydrobenzoin with methyl iodide and silver oxide substantially as shown by Irvine et al., J. Chem. Soc. 91, 1390 (1907).

EXAMPLE 6

α,α'-Dimethylhydrobenzoin was prepared by refluxing a solution of acetophenone in isopropyl alcohol containing a trace of acetic acid under illumination by a source of actinic light.

Ketene was bubbled for one hour into a solution of 25 g. of α,α'-dimethylhydrobenzoin in 200 ml. of chloroform containing two drops of concentrated sulfuric acid. The temperature of the mixture rose from 22° C. to 47° C. in 40 minutes and thereafter declined. The chloroform solvent was removed by vacuum distillation and the residual syrup was crystallized twice from petroleum ether containing a small amount of acetone. White crystals of α,α' - diacetoxy - α,α' - dimethylbibenzyl were obtained, yield 6.0 g. This material had no sharp melting point but decomposed slowly above about 130° C. Its identity as the compound named was confirmed by elemental analysis and infrared spectroscopic examination.

EXAMPLE 7

By the method shown in Example 6, 4,4'-dichloro-α,α'-dimethylhydrobenzoin was prepared from 4'-chloroacetophenone and acetylated with ketene to obtain α,α'-diacetoxy-4,4'-dichloro-α,α'-dimethylbibenzyl, a crystalline solid which decomposed slowly above 180° C.

By methods similar to those shown above, other compounds of this general class are prepared. For example, by the reaction of ethyl 4-methoxy-α-methylbenzyl ether with di-tert-butyl peroxide there is produced α,α'-diethoxy-4,4'-dimethoxy-α,α'-dimethylbibenzyl, by reacting methyl α-methyl-4-phenylbenzyl ether with di-tert-butyl peroxide α,α'-dimethoxy-α,α'-dimethyl-4,4'-diphenylbibenzyl is obtained, and by reacting 4,4'-dichlorobenzhydryl ethyl ether with an organic peroxide there is obtained 4,4',4'',4'''-tetrachloro-α,α'-diethoxy-α,α'-diphenylbibenzyl. Unsymmetrical compounds such as the product of Example 1 are produced by the method shown therein or by other known methods. For example, α-methoxy-α-ethyl-α'-phenylbibenzyl is obtained by the methylation with methyl iodide of the alcohol produced by the reaction of diphenylmethyl magnesium bromide with propiophenone, and 4,4' - dibromo - α,α' - bis(p - bromo-phenyl) - α - methoxybibenzyl is prepared by the reaction of p,p'-dibromodiphenylmethane with p,p'-dibromobenzhydryl methyl ether in the presence of an organic peroxide. Free radical initiators other than organic peroxides may be used to catalyze these reactions, for example, ultraviolet light. These compounds have properties similar to those of the related compounds shown in the examples.

The purification of these compounds or even their separation from the reaction mixtures in which they are produced is not necessary for their use as free radical reaction initiators.

Compounds of the class described herein are thermally unstable and break down at temperatures between about 100° C. and about 400° C., the particular decomposition point depending in each case on the structure and substituents involved. Decomposition apparently proceeds by way of the breaking of the central carbon to carbon bond and a subsequent breakdown of the radicals thereby formed to produce a free alkyl or acetoxy radical and a carbonyl compound. The two steps in this hypothetical process are illustrated by the equations shown below for the decomposition by this route of α,α'-dimethoxy-α,α'-dimethylbibenzyl.

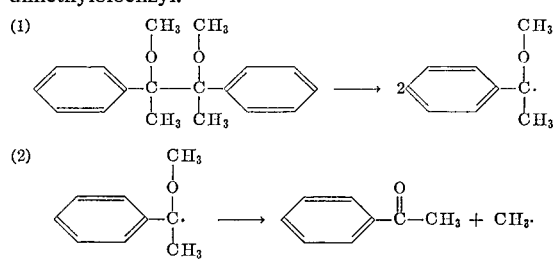

In the presence of a compound having an abstractable hydrogen atom, the free methyl radical combines with such a hydrogen atom to form methane. A free acetoxy radical decomposes to form carbon monoxide and a free methyl radical, so that whichever type of compound is involved, its decomposition can be followed by observing the liberation of a gas containing methane (or ethane in the case of α-ethoxy compounds).

Example 8 illustrates a convenient way in which the rate of decomposition of these compounds can be determined at a particular temperature.

EXAMPLE 8

A solution of 1.016 g. of α-methoxy-α,α'-diphenylbibenzyl in 19.5 g. of diphenylmethane was heated to 196° C. as rapidly as possible. As soon as this temperature was reached, gas-measuring burets were attached to the system. While maintaining the temperature at 196° C., the volume of gas evolved was followed as a function of time. This gas, which was found to be essentially pure methane, was collected by displacement of water which had previously been saturated with methane. A total of 48.2 cc. of methane was evolved in 85 minutes. Analysis of the reaction mixture after the experiment confirmed the presence in it of benzophenone.

By the method shown in Example 8, the rate of decomposition of the compound was determined at various temperatures and its half life at these temperatures was calculated. Similarly, the half life for each of a number of related compounds was determined. Table I lists the temperatures at which representative compounds undergo 50% decomposition in 10 hours.

*Table I*

| Compounds: | Temp., ° C. for 10 hr. half-life |
|---|---|
| α,α'-Dimethoxy-α,α'-diphenylbibenzyl | 114 |
| α-Methoxy-α,α'-diphenylbibenzyl | 164 |
| α,α'-Dimethoxy-α,α'-dimethylbibenzyl | 226 |
| 4,4' - di - tert-butyl - α,α' - dimethoxy - α,α'-dimethylbibenzyl | 230 |

Examples 9–12 show the application of these compounds as reaction initiators in different types of free radical chain reactions.

EXAMPLE 9

A mixture of 19.2 g. of isopropyl alcohol, 1.57 g. of 1-octene, and 0.54 g. of α,α'-dimethoxy-α,α'-dimethylbibenzyl was heated in a sealed glass tube at 235–240° C. for 12 hours. Analysis of the reaction mixture showed a yield of 29% of 2-methyl-2-decanol, based on the 1-octene charged.

When this experiment was repeated in the absence of the bibenzyl compound, no reaction took place. Similarly, other alpha olefins are reacted with primary and secondary alkanols to obtain the corresponding secondary and tertiary alcohols as products.

EXAMPLE 10

The free radical addition of cyclohexane to formaldehyde was accomplished by heating a mixture of 21.0 g. of cyclohexane, 1.50 g. of paraformaldehyde, and 0.68 g. of α,α'-dimethoxy-α,α'-dimethylbibenzyl in a sealed glass tube at 250° C. for 12 hours. A yield of 53% of cyclohexyl carbinol, based on the cyclohexane consumed, was found in the reaction mixture. No reaction was obtained when the experiment was repeated in the absence of the bibenzyl initiator.

This reaction is also applicable to other cycloalkanes such as cyclopentane, cycloheptane, and methylcyclohexane, the corresponding cycloalkyl carbinols being obtained.

EXAMPLE 11

Each of two identical test tubes was charged with 20.0 g. of N-vinyl-5-methyloxazolidinone. Into one tube there was also put 0.20 g. of α,α'-dimethoxy-α,α'-diphenylbibenzyl. The tubes were flushed with nitrogen for one hour and then were heated at 125–130° C. for 4 hours while maintaining the nitrogen atmosphere. After cooling to room temperature, the contents of each tube was poured into 100 ml. of ether. The contents of the tube containing the bibenzyl initiator formed a precipitate of 5.2 g. of solid white poly-N-vinyl-5-methyloxazolidinone. The tube which contained no initiator gave no solid polymer.

EXAMPLE 12

Polymerization of N-vinyl-5-methyloxazolidinone was accomplished as shown in Example 11 but using α,α'-diacetoxy, α,α'-dimethylbibenzyl as the initiator. This experiment was run at 185–195° C. because of the somewhat higher decomposition temperature of this bibenzyl compound.

By procedures similar to those of Examples 9–12, other known free radical chain reactions are initiated by the thermal decomposition of the bibenzyl compounds shown above and defined by the generic formula. For example, other polymerizable olefinically unsaturated monomers such as styrene, acrylic compounds, vinyl chloride, isoprene, divinylbenzene, and the like are polymerized and copolymerized. Similarly, polymers having suitably re- active sites in the polymer molecules are crosslinked or graft polymerized by application of this process. Free radical addition and displacement reactions such as telomerizations and other additions to multiple bonds as previously described are also initiated in the same way.

Within the class of bibenzyl compounds defined by the general formula shown above, there has been found a subclass of new compounds which have unusual and unexpected properties in addition to the free radical chain reaction initiation capability shown by the compounds of the class as a whole. These new compounds are those where $R^2$ is hydrogen and their general formula is as follows:

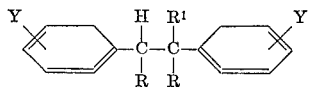

wherein Y, R and $R^1$ are as previously defined. Preferably $R^1$ is methoxy and R is phenyl or substituted phenyl. The compounds of the above-defined subclass have the unusual property of conferring synergistically improved flame resistance when combined in small amounts with a polymer composition containing brominated organic compounds as flame resistant or fire retardant additives. This property is not shown by other bibenzyl compound of the general class where $R^2$ is methoxy, ethoxy, or acetoxy.

We claim:

1. A process for initiating a free radical reaction selected from the group consisting of (1) substitution reactions wherein there are successive displacement reactions, (2) successive addition reactions to unsaturated molecules to produce long chains of covalently bonded atoms, and (3) alternate displacement and addition reactions involving radical additions to multiple bonds, which process consists essentially of contacting at about 100° C. to about 400° C. a substrate capable of undergoing said free radical reaction with from about 0.1% to about 50% by weight of said substrate of a compound of the formula

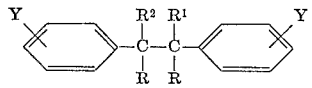

wherein Y is selected from the group consisting of hydrogen, alkyl of one to about six carbon atoms, halogen, phenyl, and alkoxy of one to about two carbon atoms, R is selected from the group consisting of hydrogen, alkyl of one to about two carbon atoms, and

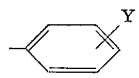

$R^1$ is selected from the group consisting of alkoxy of one to about two carbon atoms and acetoxy, and $R^2$ is selected from the group consisting of hydrogen, alkoxy of one to about two carbon atoms, and acetoxy.

2. The process of claim 1 wherein the compound is α,α'-dimethoxy-α,α'-diphenylbibenzyl.

3. The process of claim 1 wherein the compound is α-methoxy-α,α'-diphenylbibenzyl.

4. The process of claim 1 wherein the compound is α,α'-dimethoxy-α,α'-dimethylbibenzyl.

5. The process of claim 1 wherein the compound is 4,4'-di-tert-butyl-α,α'-dimethoxy-α,α'-dimethylbibenzyl.

6. The process of claim 1 wherein the compound is α,α'-dimethoxybibenzyl.

7. A process for initiating vinyl polymerization of a polymerizable vinyl monomer which comprises contacting said monomer at about 100° C. to about 400° C. with about 0.1% to about 10% by weight of a compound of the formula

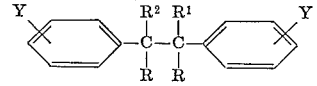

wherein Y, R, $R^1$ and $R^2$ are as defined in claim 1.

References Cited by the Examiner

UNITED STATES PATENTS

| | | | |
|---|---|---|---|
| 2,776,952 | 1/1957 | Bredereck et al. | 260—80 |
| 2,958,681 | 11/1960 | Campbell | 260—80 |
| 2,973,390 | 2/1961 | Nedwick et al. | 260—631 |
| 3,017,438 | 1/1962 | Atwood | 260—632 |
| 3,020,317 | 2/1962 | Klager | 260—632 |
| 3,021,374 | 2/1962 | De Radzitzky | 260—631 |
| 3,025,328 | 3/1962 | Carlson | 260—611 |
| 3,047,633 | 7/1962 | Bruson et al. | 260—611 |
| 3,066,115 | 11/1962 | Smith et al. | 260—78.5 |

OTHER REFERENCES

J. C. S. 952 pp. 4675–4678, reference thereto can be found in Chem. Abstracts, vol. 47 p. 10508 i.

JOSEPH L. SCHOFER, *Primary Examiner.*

DONALD E. CZAJA, *Examiner.*

L. WOLF, *Assistant Examiner.*